Feb. 6, 1940.  E. E. PRENTICE  2,189,117

SELF-ALIGNING BEARING

Filed Feb. 8, 1937

INVENTOR.
Earl E. Prentice
BY J. E. Trabucco
ATTORNEY

Patented Feb. 6, 1940

2,189,117

UNITED STATES PATENT OFFICE 2,189,117

SELF-ALIGNING BEARING

Earl E. Prentice, Palo Alto, Calif.

Application February 8, 1937, Serial No. 124,626

4 Claims. (Cl. 308—26)

This invention relates to improvements in self-aligning shaft bearings.

An object of my invention is to provide an improved self aligning bearing capable of readily adjusting itself to a change in position of the shaft which it rotatably supports.

Other objects of my invention are: To provide an improved self-aligning and noiseless shaft bearing having non-metallic contact between the relatively movable parts; to provide a bearing capable of automatically taking up any wear occurring by reason of the misalignment of the shaft or on account of vibrations; to provide a sound proof bearing adapted to absorb the vibrations ordinarily set up by the rotation of its associated shaft; and to provide an improved shaft bearing having novel features of construction and combinations and arrangement of parts.

Further objects of my invention will be pointed out hereinafter, indicated in the appended claims or will be obvious to one skilled in the art upon an understanding of the present disclosure. For the purposes of this application I have elected to show herein certain forms and details of a shaft bearing representative of my invention; it is understood, however, that the embodiment of my invention herein shown and described is for the purpose of illustration only, and that therefore it is not to be regarded as exhaustive of the variations of the invention, nor is it to be given an interpretation such as might have the effect of limiting the claims short of the true and most comprehensive scope of the invention in the art.

Figure 1:
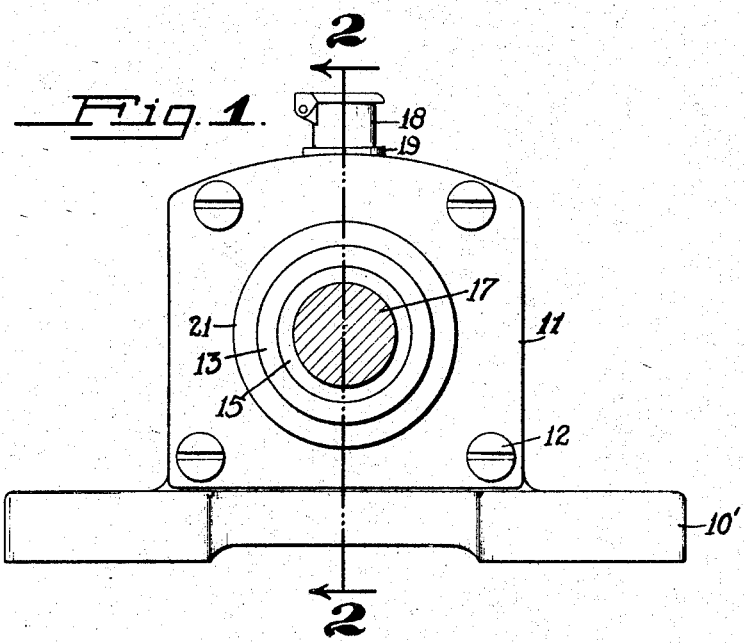
Figure 2:
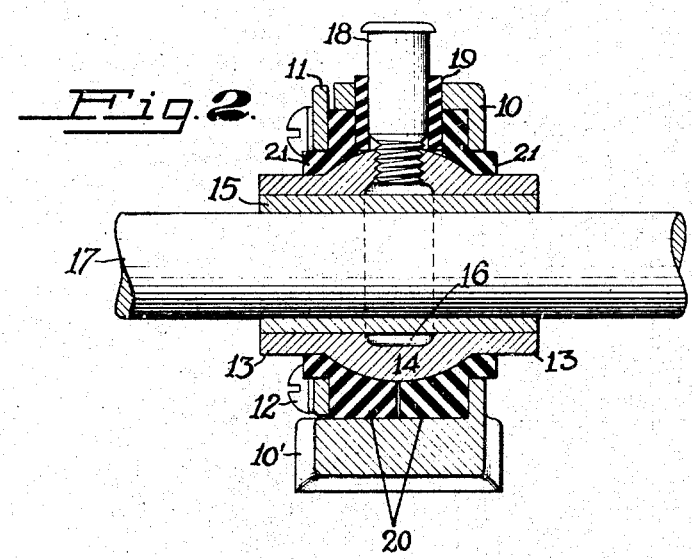

In the accompanying drawing:

Fig. 1 is an end view of a pillow block having a bearing of the type embodying my invention supported thereby; and Fig. 2 is a vertical sectional view taken on the line 2—2 of Fig. 1.

Referring to the drawing, the numeral 10 designates a suitably shaped housing having an end plate 11 secured thereto, as by bolts 12. The housing is preferably formed as a pillow block with a base 10', but it may just as well be provided with side flanges, hangers or other suitable means for securing it in various ways to a supporting structure. The opposite ends of the housing are provided centrally with horizontally aligned circular openings of a diameter greater than the external diameter of the cylindrical ends 13 of a suitably shaped bushing 14. The bushing is formed with a frustro-spherical middle section which is centrally positioned in the housing 10, and the cylindrical ends 13 project outwardly in opposite directions through the openings in the ends of the housing. Mounted inside the bushing 14 is a sleeve 15 constructed preferably from a porous copper alloy material of the kind capable of absorbing oil for lubrication purposes supplied from an annular reservoir 16 located centrally between the said sleeve and the bushing. The interior diameter of the sleeve 15 is of sufficient size to accommodate a rotatable shaft 17.

Extending through an enlarged opening provided in the top side of the housing 10 is an oil cup 18, the inwardly disposed end of which is screwed into a threaded opening in the frustro-spherical part of the bushing 14. Oil admitted to the cup 18 enters the reservoir 16 and is thereafter absorbed by the porous sleeve 15. Extending around the oil cup 18 and so disposed as to prevent the latter's contact with the housing 10, is a resilient tubular member 19 which is made from rubber, synthetic rubber or other suitable sound-proof elastic material.

Surrounding the frustro-spherical part of the bushing 14 are two complementary resilient cup-shaped members 20, the opposite annular ends 21 of which extend outwardly through the openings in the ends of the housing. The cup-shaped members 20 are made from a suitable resilient material such as rubber or synthetic rubber, and they are so shaped as to amply fill the space in the housing not occupied by the bushing 14, the oil cup 18 and the tubular member 19. The cup-shaped members 20 at their upper sides are formed with complementary openings through which the oil cup 18 and its associated tubular member 19 extend. While it is not particularly desirable to do so on account of the inconvenience in assembly, the two complementary cup-shaped members 20 may be molded into a one-piece member of the required shape. The normal size of the resilient cup-shaped members 20 is somewhat greater than the unoccupied space in the housing 10, thereby permitting the end plate 11, when it is being secured in place, to engage with the outer end of its adjacent cup-shaped member. After the bushing 14 and the sleeve 15 have been suitably aligned with respect to the permanent position of the shaft 17 the screws 12 are turned so as to cause the end plate 11 to be drawn into firm engagement with its adjacent cup-shaped member 20. The somewhat flowable characteristics of the resilient material comprising the cup-shaped members 20 permit the entire cavity within the housing surrounding the bushing 14 to be filled with the compressed resilient material, and any change in position of the shaft from its initial position will also be accompanied by a corresponding change in the distribution or position of the said resilient material. The resilient material surrounding the frustro-spherical section of the bushing 14 allows the bearing to readily change its position so as to realign itself in accordance with a change in position of the shaft. The resilient material comprising the cup-shaped members 20 being positioned between the bushing 14 and the housing 10 so there is no metal to metal contact between the relatively movable parts of the bearing, affords a noiseless construction wherein the vibrations ordinarily set up through the shaft's rotation are not allowed to be transferred to the structure upon which the device is supported.

Having described my invention, what I claim is:

1. In a self-aligning bearing, a housing having openings in its opposite ends, a bushing positioned in the housing having an enlarged central portion and oppositely disposed cylindrical end portions, the end portions of the bushing projecting through the openings in the ends of the housing, a porous lining in the bushing, resilient members surrounding the enlarged central portion of the bushing and so disposed as to prevent the bushing from contacting the housing, an oil reservoir positioned between the liner and the bushing, and an oil cup extending through the bushing for supplying oil to the reservoir.

2. In a self-aligning bearing, a housing having openings in its opposite ends, a bushing positioned in the housing having a spherical central section and oppositely disposed cylindrical ends, the said ends projecting through the openings in the housing, a porous liner in the bushing, a pair of complementary cup-shaped resilient members surrounding the central section of the bushing and so disposed as to prevent the contact of the bushing with the housing, an annular oil reservoir positioned between the liner and the bushing, and an oil cup extending through the housing for supplying oil to the reservoir.

3. In a self-aligning bearing, a bushing having a spherical central section and cylindrical end sections, a housing within which the bushing is mounted, the said housing having openings in its opposite ends through which the cylindrical ends of the bushing extend, the said openings having a diameter greater than the outer diameter of the cylindrical ends of the bushing, a resilient member surrounding the spherical section of the bushing and also a portion of its cylindrical ends, the said resilient member being in firm contact with the housing and the bushing and being so disposed as to prevent the engagement of the bushing with the housing irrespective of the normal operating position of the bushing with respect to the housing, a porous liner in the bushing, an oil reservoir between the liner and the bushing, and oil delivery means extending from a point externally of the housing to the oil reservoir.

4. In a self-aligning bearing, a bushing having an enlarged frustro-spherical central section and cylindrical end sections, a housing having one open end and an opposite end with opening accommodating one cylindrical end section of the bushing, a rubber-like member surrounding the spherical section of the bushing, a removable end member positioned at the open end of the housing having an opening accommodating the other cylindrical section of the bushing, and means for adjustably fastening said end member to the housing for maintaining the rubber-like member in lateral compression.

EARL E. PRENTICE.